United States Patent [19]

Arnold et al.

[11] 3,792,466

[45] Feb. 12, 1974

[54] KEYBOARD ENTRY SYSTEM WITH N-KEY ROLLOVER AND N-KEY LOCKOUT PROTECTION

[75] Inventors: Edward H. Arnold, King of Prussia; Donald L. McLaughlin, Newtown Square, both of Pa.

[73] Assignee: MOS Technology, Inc., Valley Forge, Pa.

[22] Filed: May 31, 1972

[21] Appl. No.: 258,389

[52] U.S. Cl.. 340/365 E, 340/146.1 AB, 340/365 S
[51] Int. Cl. ........ G06f 3/02
[58] Field of Search ........ 340/365 E, 146.1 AB

[56] References Cited

UNITED STATES PATENTS 3,675,239 7/1972 Ackerman et al. ........ 340/365 E

*Primary Examiner*—Donald J. Yusko
*Assistant Examiner*—Robert J. Mooney
*Attorney, Agent, or Firm*—Cooper, Dunham, Clark, Griffin & Moran

[57] ABSTRACT

A keyboard entry system having a keyboard encoder array which scans a keyboard matrix in successive scan cycles to detect depressed keys and to generate an output in the form of a multibit code corresponding to each newly depressed key. The keyboard encoder array includes N-key rollover protection logic and N-key lockout logic. The N-key rollover logic properly interprets the depression of each new key regardless of the number of other keys which have been previously depressed and are still held in their depressed states. The N-key lockout logic validates the data representing a depressed key only if two or more keys have not been depressed within the same or within consecutive scan cycles.

25 Claims, 3 Drawing Figures

KEYBOARD ENTRY SYSTEM WITH N-KEY ROLLOVER AND N-KEY LOCKOUT PROTECTION

BACKGROUND OF THE INVENTION

The invention relates to a keyboard entry system comprising a keyboard encoder array cooperating with a keyboard matrix to detect depressions of keys and to generate a unique multibit binary code corresponding to each depressed key. More specifically, the invention relates to a keyboard encoder array which scans the keyboard matrix in successive scan cycles which are shorter in duration than the fastest anticipated time delay between the manual operation of two successive keys and provides protection against N-key rollover errors and against errors resulting from simultaneous depression of keys.

One possible problem in keyboard entry systems of this type is the so-called N-key rollover error which occurs when a new key is depressed before one or more previously depressed keys have been released. This occurs most often when proficient keyboard operators reach rapid burst typing speeds, such as when striking familiar letter groupings as "and," "the," "-ing." A keyboard entry system outputs serially, i.e., one letter, number or other symbol at a time. When two or more keys are in their depressed state while the key matrix is examined for depressed keys, a keyboard system without N-key rollover protection would either fail to generate data for each of the two or more depressed keys or generates erroneous data.

Another possible problem with keyboard entry systems of this type is an error resulting when two or more keys are pressed down simultaneously or almost simultaneously. When a keyboard entry system is operated properly, the keys must be depressed sequentially. An experienced operator may achieve high data entry speed, but must still depress keys in sequence to enter unambiguous data. If the keyboard matrix is scanned completely once every several milliseconds, and if two or more newly depressed keys are sensed within the same scan cycle or within consecutive scan cycles, it may be assumed that the information provided by these keys is ambiguous since an operator connot distinguish between two or more events which occur within several milliseconds.

It is of course desirable that data provided by a kayboard entry system be unambiguous and accurate, and different efforts have been made in the past to detect and indicate erroneous conditions. For example, Watson, U.S. Pat. No. 3,576.569, is directed to a system to inhibit the generation of data when two or more keys are simultaneously in their depressed states. An electrical interlock threshold circuit detects the voltage across resistors associated with the keys and inhibits the generation of data when two or more keys are depressed simultaneously and hence the voltage across the resistors exceeds the voltage existing when a single key is depressed. Juliusberger, U.S. Pat. No. 3,493,928, is also directed to providing an error signal if two or more keys are at any time simultaneously in their depressed states, and also uses threshold gates connected to resistors associated with the keys. Similar threshold systems are described in Blankenbaker, U.S. Pat. No. 3,483,533, Hanewinkel, U.S. Pat. No. 3,573,810 and in Walters N.L., Multiple Key Detection in Noninterlock Keyboards, IBM Technical Disclosure Bulletin, Volume 14, No. 3, August 1971, pages 780, 781.

A system handling a two-key roll situation by outputing the information corresponding to the key which is pressed first and suppressing the information corresponding to the second depressed key is disclosed in Lankfort L.G., Keyboard Circuit, IBM Technical Disclosure Bulletin, Volume 9, No. 6, November 1966, pages 586, 587. In the Lankford system, in case of overlap of two depressed keys, only data for the first key is generated while data for the second, subsequently depressed key is not generated until the first key is released. The second key data may be lost if the second key is released before the first.

What is logically desirable in N-key rollover situations is that valid data be generated and output in response to a key being pressed down into a depressed state. Then, no new data should be generated for that key and the key should be ignored during successive scan cycles for as long as that key remains depressed. If a subsequent key is depressed, new data corresponding to that subsequent key should be generated and output, and each newly depressed key should be properly interpreted regardless of the number of other keys which have been previously depressed and not released. The release of a key should cause no change in the output data. None of the systems discussed above provide that feature.

A system designed to provide an error signal when two or more new keys are pressed down within a defined short period of time is described in Jones, Jr., U.S. Pat. No. 3,456,077. In that system, when a key is depressed, a multivibrator generates a signal of 20 milliseconds duration and an error is indicated if a subsequent key is depressed within that 20 milliseconds. What is desirable in the simultaneous depression of keys situation is to establish history on a scan to scan basis and to indicate an error when two or more new keys are depressed either within the same scan or within consecutive scans. The Jones, Jr. system does not relate to a scanned keyboard and hence establishes no history of preceding scans.

SUMMARY OF THE INVENTION

The invention is in the field of keyboard entry systems and relates particularly to a keyboard encoder array which scans a keyboard matrix in successive scan cycles to detect depressed keys and to generate and to output a multibit code corresponding to each newly depressed key. The invention is particularly directed to solving the problems of N-key rollover and of simultaneous key depression.

N-key rollover occurs when a new key is depressed while at least one key which has been previously depressed is still in its depressed state. If no protection is provided for this situation, codes may be erroneously generated for keys which have been previously depressed and for which valid data has already been generated and output. The subject invention solves the N-key rollover problem by generating valid data when a key is first depressed, and not generating data for that key so long as it is held down. When a subsequent key is depressed, data for that key is generated, such that each new key is properly interpreted regardless of the number of other keys which have been previously depressed and are still in their depressed states. The release of a key causes no change in the generated data.

The invented system solves the N-key rollover problem by protection logic which accepts "key depressed" signals from the logic which examines the keyboard matrix. During each scan cycle, the key depressed signals are stored in a shift register which is as long as the number of keys in the keyboard matrix. At the end of each scan cycle, the shift register contains a key depressed signal (a logical 1) corresponding to each depressed key in the key matrix. Additionally, during each scan cycle, the current key depressed signals are compared with the contents of the shift register which contains the key depressed signals from the previous scan cycle. When the current scan cycle detects a depressed key which was not depressed in the previous scan cycle, a signal is provided to indicate a newly depressed key. This signal is called a "key detect" signal. The N-key rollover protection logic thus detects each newly depressed key to provide a key detect signal, ignores all keys previously depressed and not released, and ignores the release of any key. The key detect signal is used as the enabling signal for generating encoded data for a depressed key.

The invented system is also directed to the problem of detecting ambiguous data resulting from simultaneous or almost simultaneous depression of two or more keys. When the keyboard matrix is scanned in short scan cycles (e.g., when the entire keyboard matrix is scanned in several milliseconds) an operator cannot depress in normal operation two or more keys in succession such that the keys would appear within the same scan cycle or in two consecutive scan cycles. It is therefore valid to assume that should two or more key detect signals indicating the depression of two new keys be received in the same or consecutive scan cycles, the keys are depressed simultaneously and the data resulting therefrom is not valid. To this end, the invented system provides a validation logic which includes two storage devices which are cleared before the start of each scan cycle. The first storage device is set by the first key detect signal indicating a newly depressed key, and the second storage device is set if there is a second key detect signal within the same scan cycle indicating the depression of a second key in that scan cycle. A valid scan is one in which only the first storage device is set, and an invalid scan, an erroneous condition, is indicated if both storage devices are set within the same scan cycle.

To detect the condition when two or more keys are depressed in consecutive scan cycles, the validation logic also includes a three-bit shift register which is fed by the outputs of the two storage devices. If a new key is depressed during one scan cycle and another new key is depressed during the next scan cycle, the three-bit shift register would contain two ones and would indicate an erroneous condition. If no new key is depressed either in the preceding or in the succeeding scan cycle of the depression of a key, the three-bit shift register would contain only one 1 (a 010 code) and would not indicate an erroneous condition. A 010 code in the shift register indicates valid data may be used to gate out of the system an eight-bit code corresponding to a key.

Thus, the invented keyboard encoder array resolves an N-key rollover situation by correctly outputing data for each newly depressed key and ignoring previously depressed and interpreted, but not yet released keys, and provides an error indication if two or more new keys are depressed within too short a time period (e.g., within the same or successive scan cycles). The error signal can be used to inhibit data generation or data transmission.

DETAILED DESCRIPTION

FIG. 1

Figure 1:
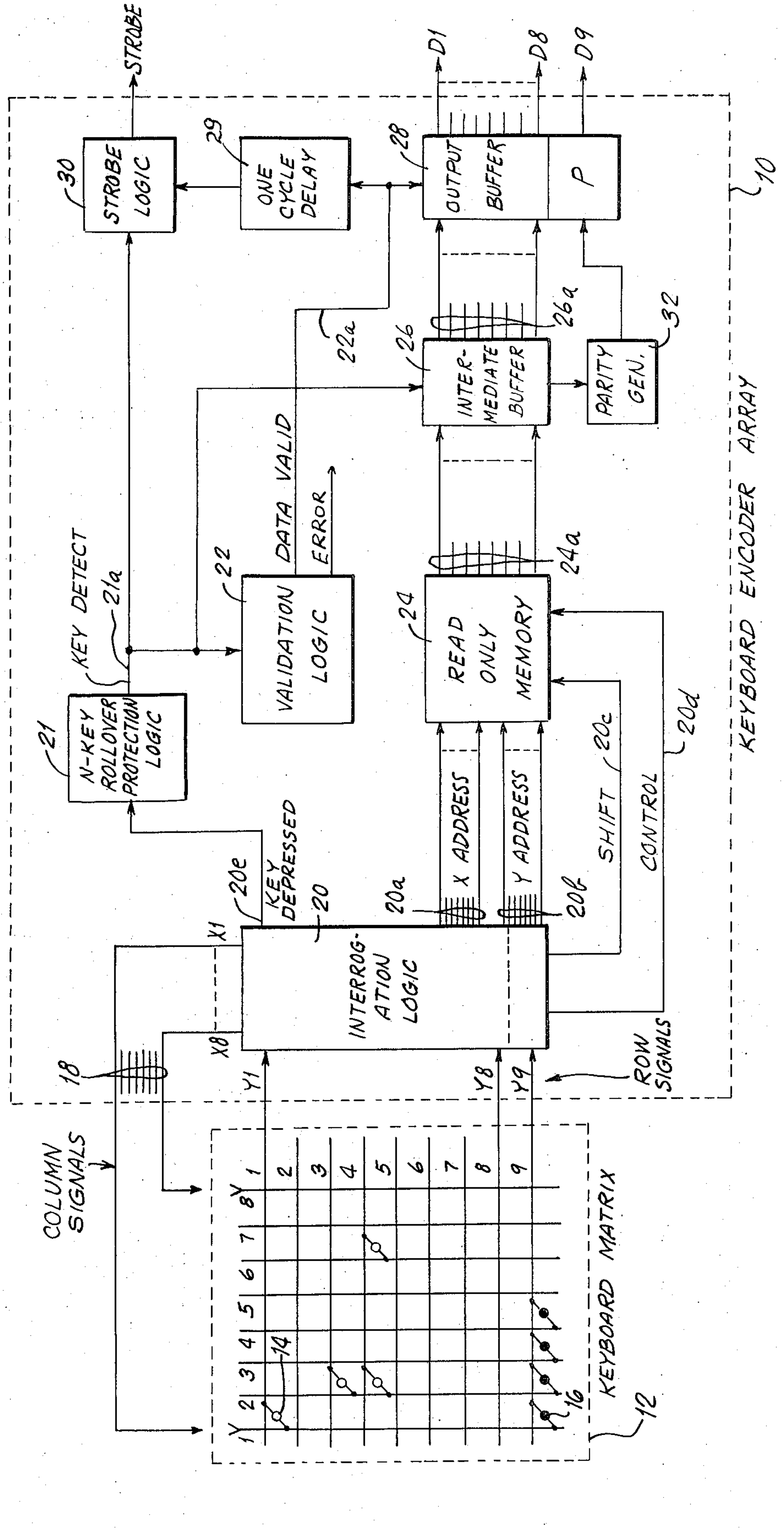
FIG. 1 is a block diagram of a keyboard entry system having a keyboard matrix and a keyboard encoder array including N-key rollover protection logic and N-key lockout validation logic.

In the block diagram shown in FIG. 1, a keyboard encoder array generally indicated at 10 detects and interprets depressed keys of a keyboard matrix 12 to provide a unique multibit code corresponding to each newly depressed key of the keyboard matrix 12 and to provide an error signal inhibiting the generation of such multibit codes in case of simultaneous key depression. The keyboard matrix 12 comprises a matrix consisting of, for example, eight column lines and eight row lines which allow for up to 64 data keys 14. A ninth row line is included to provide for up to eight special function or control keys 16. Each of the keys 14 and 16 is movable between a neutral position in which it is an open circuit and a depressed position in which it connects electrically a selected row line with a selected column line. The keys 14 and 16 can be of the reed switch variety, but other key types may be used if they perform the equivalent function (i.e., a continuous voltage level transmitted through the switch for as long as the key is depressed).

An interrogation logic circuit 20 which forms a part of the keyboard encoder array 10 generates voltage levels which are applied through interrogation lines 18 successively to each of the column lines 1 through 8 of the keyboard matrix 12. Any data key 14 which is in its depressed state causes the row line to which it is connected to transmit a voltage level back to the interrogation logic 20 over row signal lines Y1 through Y8. The row lines Y1 through Y8 are inspected one at a time by the interrogation logic 20. If a total scan cycle consists of 64 unique time periods, then each time period defines a specific key 14 at a unique intersection of a column and a row line of the keyboard matrix 12. The control keys 16 arranged along the ninth row of the keyboard matrix 12 are interrogated by voltage levels over the interrogation lines 18 during the same scan cycle used for the data keys 14.

When the keyboard matrix 12 is operated normally, rapid typing speeds can cause errors resulting from depression of a new key before previously depressed keys have been released. This type of error is called N-key rollover. Additionally, a different type of error occurs when two or more data keys 14 are pressed down simultaneously or almost simultaneously, since it is then ambiguous as to which key the operator meant to press first.

The keyboard encoder array 10 therefore includes an N-key rollover protection logic 21 to resolve unambiguously N-key rollover situations, and also includes validation logic 22 which provides an error signal when two or more keys are pressed down simultaneously.

Briefly, the N-key rollover protection logic 21 resolves N-key rollover situations by comparing the results of successive scan cycles and generating key detect signals only for those key depressed signals which correspond to newly depressed keys. In particular, the results of each scan cycle are stored (replacing the stored results of the immediately preceding scan cycle) and the stored results are compared with the results of the immediately succeeding scan cycle. When the comparison indicates that a new key is in its depressed state during that succeeding scan cycle, i.e., a key which was not in its depressed state in the scan cycle whose results are stored, a key detect signal is generated for that newly depressed key. Thereafter, as long as the key is held down, no additional key detect signals are generated for it even though key depressed signals may be generated for it. If another key is depressed, however, a new key detect signal is generated for it, and thus each newly depressed key is properly interpreted regardless of the number of other keys previously depressed and held.

The validation logic 22, on the other hand, detects simultaneous key depressions, i.e., depression of two or more keys within the same scan cycle or within consecutive scan cycles, and generates an error signal when the simultaneous key depression condition occurs. In particular, the validation logic 20 detects the generation of two or more key detect signals within the same or within two consecutive scan cycles.

When the interrogation logic 20 detects the existence of a depressed key in the keyboard matrix 12, this key is identified by signals over the X address and Y address lines 20*a* and 20*b*, respectively, which connect the interrogation logic 12 with a read only memory 24, and the read only memory 24 provides at its output lines 24*a* a unique eight-bit code identifying the pressed key detected by the interrogation logic 20. If shift or control keys 16 have been depressed, either or both of the shift and control lines 20*c* and 20*d* respectively which connect the interrogation logic 20 with the read only memory 24 may be activated. The read only memory contains a 22 bit code for each data key 14 of the keyboard matrix 12. The particular combination of signals on the shift and control lines 20*c* and 20*d* selects a specific group of eight of these 22 bits and provides these selected eight bits at the output lines 24*a* of the read only memory 24.

The N-key rollover protection logic is connected with the interrogation logic 20 by means of a key depressed line 20*e* and receives therefrom a key depressed signal for each depressed key detected by the interrogation logic 20. When the N-key rollover protection logic 21 determines that a key depressed signal received over the line 20*e* is for a key which is newly depressed, i.e., for a key which was not in its depressed state during the immediately preceding scan cycles, the N-key rollover protection logic 21 places a key detect signal on its output line 21*a*. This key detect signal on the output line 21*a* is applied to an intermediate buffer 26 which receives as inputs the eight-bit code provided at the output lines 24*a* of the read only memory. The key detect signal is used to enable the intermediate buffer 26 to accept the eight-bit code for the newly depressed key identified by the N-key rollover protection logic 21. Thus, the intermediate buffer 26 stores the eight-bit code for each newly depressed key 14 on the keyboard matrix 12 as identified and gated into buffer 26 by a key-detect signal generated by the N-key rollover protection logic 21, which signal is applied to buffer 26 via line 21*a*.

The key detect signal present on the output line 21*a* of the N-key rollover protection logic 21 is also applied to the validation logic 22. As described earlier, the validation logic 22 determines if two or more data keys 14 have been newly depressed within the same scan cycle or within two consecutive scan cycles. If the validation logic 22 determines that a simultaneous key depression condition does not exist, i.e., if it determines that only one new key is depressed within any three consecutive scan cycles, it provides a data valid signal at its output line 22*a*. The data valid signal on the output line 22*a* is applied to an output buffer 28 which receives as its input the eight-bit code stored in the intermediate buffer 26, enabling the output buffer 28 to accept the eight bits stored in the intermediate buffer 26. If the validation logic 22 detects a simultaneous key depression condition, i.e., it determines that two or more new keys have been pressed within the same or within two successive scan cycles, it places on the data valid line 22*a* a signal which disables the output buffer 28 and prevents the transmission of an eight-bit code identifying a key.

A strobe logic 30 generates a strobe signal 1 clock cycle after an eight-bit code has been transferred to the output buffer 28. The strobe signal is generated in response to a data valid signal on the line 22*a*. For normal operation, this strobe signal remains true until a new key depression is detected or until all data keys have been released. The strobe logic 30 is reset by key detect signals on the line 21*a* from the N-key rollover protection logic 21. The data outputs of the output buffer 28 remain true until detection and validation of a new key depression. A parity generator 32 may be connected to the intermediate buffer 26 to generate a parity bit and to provide the generated parity bit to the output buffer 28. The output of the output buffer 28 may then be eight data bits identifying a validly depressed data key of the keyboard matrix 12 and a parity bit associated with those eight bits.

Figure 2:
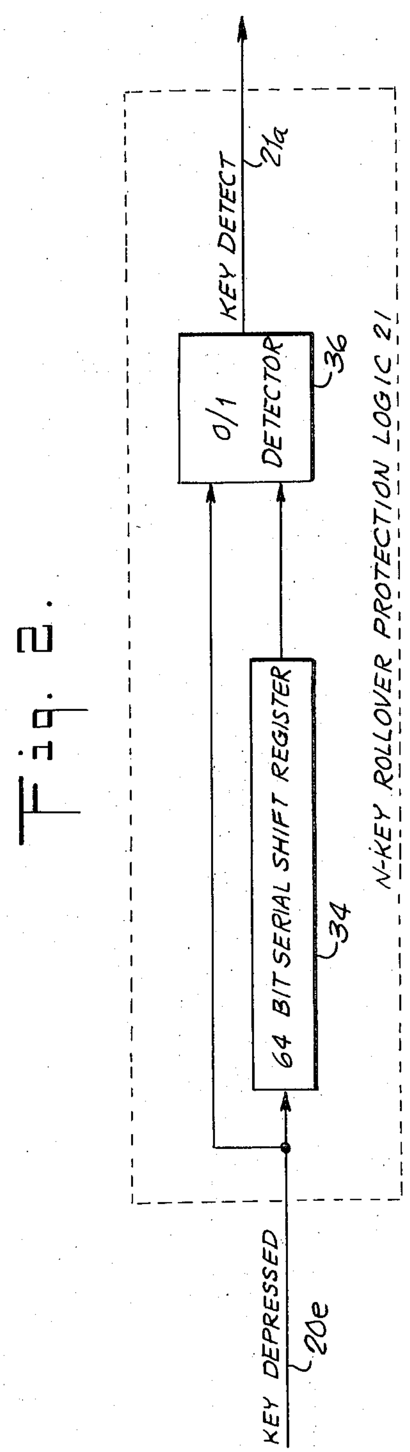
FIG. 2 is a block diagram of the N-key rollover protection logic forming a part of the keyboard entry system shown in FIG. 1.

FIG. 2 — N-Key Rollover Protection Logic

The N-key rollover protection logic 21 includes a 64 bit serial shift register 34 and a 0/1 detector 36. The shift register 34 is connected to the interrogation logic 20 through line 20*e*, as discussed above, and it thus receives either a 0 or a 1 for each data key 14 interrogated by the interrogation logic 20. Since a scan cycle consists of 64 unique time periods, one for each data key 14, the shift register 34 is pulsed 64 times within a single scan cycle, and stores a zero if the corresponding data key 14 is in its neutral or undepressed position and a 1 if the corresponding data key 14 is in its depressed position. Thus, at the end of each scan cycle, the shift register 34 stores a zero in each position corresponding to a key 14 in a neutral position, and a 1 at each position corresponding to a data key 14 in a depressed position. The 64-bit serial shift register 34 operates as a first-in-first-out shift register, and its output serves as one of the two inputs of the 0/1 detector 36. The other input of the 0/1 detector 36 is directly from the interrogation logic 20, over line 20*e*. Thus, the 0/1 detector 36 compares the state of each key of the keyboard matrix 12 in two consecutive scan cycles.

The 0/1 detector 36 provides no output as to each key scanned if the key was in a neutral position in both of the two consecutive scan cycles, or if the key was in a depressed position in both of the consecutive scan cycles, or if the key was in a neutral position in the current scan cycle but was in a depressed position in the previous scan cycle. The 0/1 detector 36 provides an output on its key detect output line 21*a* only if a key is in its depressed position in the current scan cycle but was in a neutral position during the preceding scan cycle. Stated differently, the 0/1 detector 36 provides a key detect output on its output line 21*a* only for a data key which places a logical 1 signal on the line connecting the key depressed input 20*e* directly to the 0/1 detector 36 and has a 0 signal applied to the 0/1 detector 36 from the shift register 34. The N-key rollover protection logic 21 thus provides a key detect signal on its output 21*a* only for a newly depressed key, and ignores all the previously depressed and still held keys as well as the release of any key.

As an illustration of the operation and effect of the N-key rollover protection logic 21, if a rapid keyboard operator depressed a first key during the first scan cycle, and second and third keys during the fourth and seventh scans, for example, each being depressed at a point in the scan period before the scan reached the position of the key in question, and if the third key was depressed before the operator's fingers were removed from the first or second keys, key detect signals would be generated only during the first, fourth and seventh scan cycles — and appropriate eight-bit key identifying signals only then passed into the intermediate buffer 26 — even though one or more keys remained depressed during the entire seven scan cycles. The effect of this is to generate a key detect signal, and consequently gate through a key identifying code, only when a key is first depressed (or first sensed), without regard to how long it remains depressed, or whether another key has remained depressed from earlier scan cycles.

Figure 3:
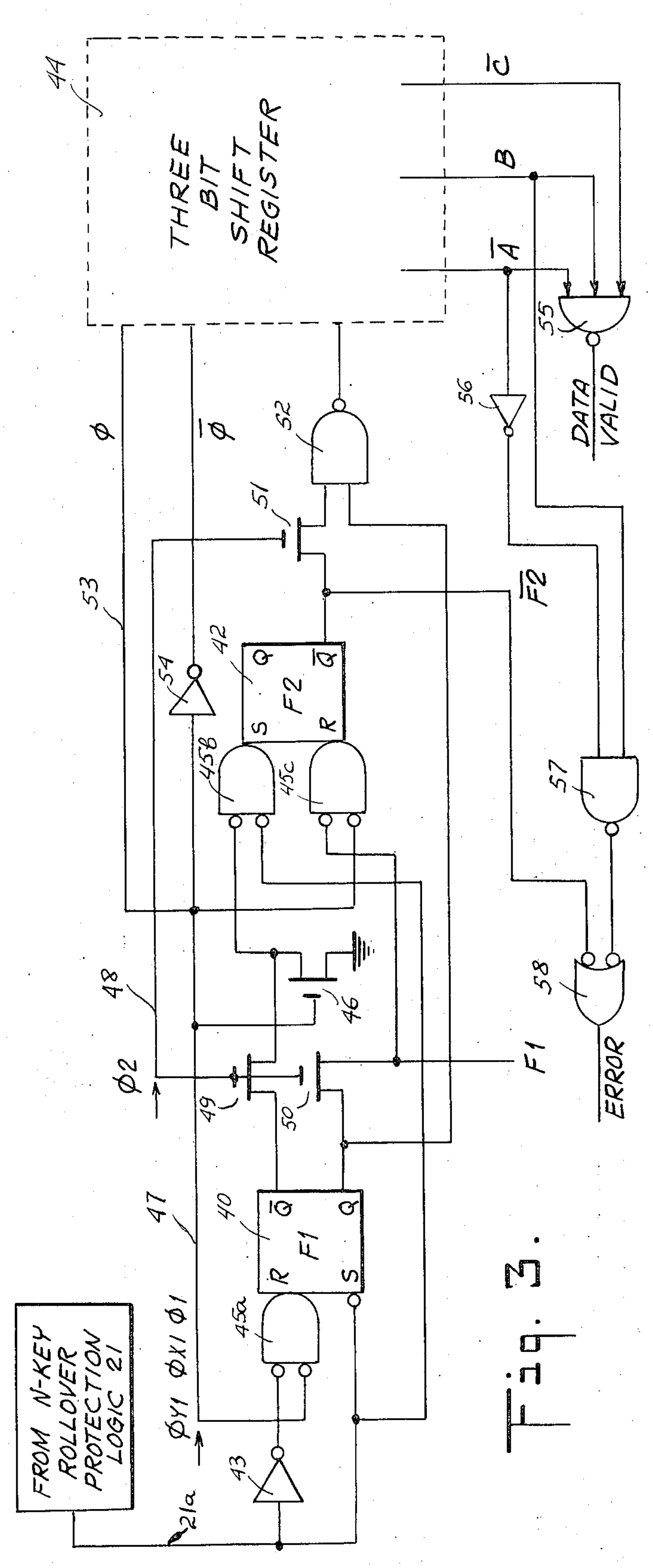
FIG. 3 is a block diagram of the N-key lockout validation logic which forms a part of the keyboard entry system shown in FIG. 1.

FIG. 3 — Validation Logic

The purpose of the validation logic shown in FIG. 3 is to detect simultaneous key depression, i.e., depression of two new keys within the same scan cycle or within two consecutive scan cycles, and to issue an error signal if such simultaneous key depression takes place. The validation logic includes two flip-flops 40 and 42 and a 3-bit shift register 44. The flip-flops 40 and 42 are used to detect the depression of two or more keys within a single scan cycle, and the 3-bit shift register 44 is used to detect the depression of two or more keys within two consecutive scan cycles. The flip-flops 40 and 42 are cleared or reset before the start of a scan cycle, the flip-flop 40 is set the first time a key is depressed within a scan cycle, and the flip-flop 42 is set if a second key is depressed within the same scan cycle. If none of the flip-flops 40 and 42 is set, or if only the flip-flop 40 is set, this means that at most one key has been depressed within a single scan cycle. If both flip-flops 40 and 42 are set, this indicates an error condition, namely, that two or more keys have been depressed within the same scan cycle.

The 3-bit shift register 44 is loaded by the outputs of the flip-flops 40 and 42. If two or more data keys 14 have been depressed within two consecutive scan cycles, more than one stage of the three-bit shift register 44 will store a signal indicating a depressed key, and an error signal will be provided. If only a single key has been depressed within one scan cycle, and no other keys have been depressed either in the preceding or in succeeding scan cycles, only one stage of the three-bit shift register 44 will be set, and a data valid signal will be provided.

As an example of the operation of the validation logic shown in FIG. 3, assume that the storage devices 40 and 42 are in their reset states and that the shift register 44 is empty, i.e., contains the code 000. Assume also that a key detect signal is placed on the line 21a from the N-key rollover protection logic during the first scan cycle, and that no key detect signals are placed on the line 21*a* from the N-key rollover protection logic during the following second and a third scan cycles. Note that the circuit shown in FIG. 3 operates in negative logic and that the key detect signal placed on the line 21*a* is a low signal.

The key detect signal on the line 21*a* occurring during the first scan cycle is applied to the input of an inverter 43, emerges therefrom as a high signal and that high signal is applied to one of the inputs of a NAND-gate 45*a* which is at the reset input of the storage device 40. This prevents resetting of the storage device 40, while at the same time the key detect signal on the line 21*a* is applied to the set input of the device 40 and sets it such that the Q-output of the device 40 goes high and the not-Q output of the device 40 goes low. The same low signal on the line 21*a* is applied to one of the inputs of a NAND-gate 45*b* which is at the set input of the second storage device 42. However, the storage device 42 is not set at this time because the other input of the NAND-gate 45*b* is at that time either grounded through a pass device 46 or disconnected from the not-Q output of the storage device 40. Note that the timing pulse on the line 47 occurs only once during a scan cycle (during the first time period, when the first key 12, at the intersection of the first X-line and the first Y-line of the keyboard matrix 12 in FIG. 1 is sensed), while the timing signals on the line 48 are out of phase with the time periods when a key detect signal may appear on the line 21*a* from the N-key rollover protection logic 21. After the time period within which the key detect signal on the line 21 occurred and set the storage device 40, the timing signal on the line 48 enables a pass device 49, a pass device 50 and a pass device 51. The pass device 49 applies the low signal at the not-Q output of the device 40 to the NAND-gate 45*b* at the set input of the device 42. However, at this time the key detect signal is no longer present at the other input of the NAND-gate 45*b*, and the device 42 is not set, i.e., it remains in its reset state, such that its not-Q output is high. Since the timing signal on the line 48 enables the pass device 51, the high signal on the not-Q output of the storage device 42 is applied to an AND-NOT gate 52 whose other input is from the Q output of the device 40. Thus, the ANDNOT gate 52 has at this time two high inputs and passes a low output which is shifted into the 3-bit shift register 44 at the next occurrence of a timing signal on the line 53. Thus, at the end of the first cycle in which a single key-detect signal was placed on the line 21*a* from the N-key rollover protection logic 21, a low signal (a logical 1) had been shifted into the shift register 44.

At the start of the second scan cycle, during which no key detect signal is placed on the line 21*a*, the first timing pulse on the line 47 (which corresponds to the interrogation of the first key 14 of the keyboard matrix 12) is applied to the shift register 44 through an inverter 54 and locks into the shift register 44 the low signal present at the output of the ANDNOT gate 52. At this time, the register 44 contains a 100 code. At the same time, the timing signal on the line 47 which corresponds to the time period for interrogating the first key 14 of the keyboard matrix 12 is applied to the NAND-gate 45*a* at the reset input of the storage device 40. The other input to that NAND-gate 45*a* is from the inverter 43 which at this time is also low since there is no key detect signal on the line 21*a*. Thus, the two inputs of the NAND-gate 45*a* are low, and its high output resets the storage device 40. Since both storage devices 40 and 42 are in their reset state in the second scan cycle, the input to the ANDNOT gate 52 from the storage device 40 is low, and the gate produces a high output which is a logical 0 for the shift register 44. This logical 0 is shifted into the shift register 44, and the shifted code is locked in the register 44 by the timing signal of the line 47 at the start of the third scan cycle. Thus, at the beginning of the third scan cycle, the shift register 44 contains a 010 code. This code is a valid pattern indicating that a new key was depressed during a scan cycle which was preceded and succeeded by scan cycles in which no new keys were depressed.

The data outputs of the three stages of the shift register 44 are connected as the inputs of an ANDNOT gate 55 which outputs a data valid signal only for the pattern 010 in the shift register 44. Note that the gate 55 is connected to the positive output of the second stage of the shift register 44 but to the negative outputs of the first and third stages. The ANDNOT gate 55 thus generates a low signal at its output when the three-bit shift register 44 stores a 010 code, and generates a high output at all other times. The low output from the ANDNOT gate 55 indicates valid data.

To illustrate the case when a new key is depressed in each of two successive scan cycles, assume again that the shift register 44 contains a logical 0 in each of its three stages and that the storage devices 40 and 42 are in their reset states. During the first scan cycle, the key detect signal on the line 21*a* (which signifies a newly depressed key) sets the storage device 40 and, as explained previously, a logical 1 is accepted into the shift register 44 during that first scan cycle and is latched therein at the start of the second scan cycle. Thus, at the beginning of the second scan cycle, the logical contents of the shift register 44 are 100. The ANDNOT gate 55 is not enabled at this time and does not place a data valid signal at its output. At the start of the second scan cycle, the storage device 40 is reset as explained earlier and during that same second scan cycle, the second key detect signal on the line 21*a* again sets the storage device 40. During the second scan cycle, a logical 1 is again shifted into the shift register 44, and at the beginning of the third scan cycle, it is locked into the register 44. Thus, at the beginning of the third scan cycle, the shift register 44 contains a 110 code. At this time the data valid gate 55 is not enabled because the signals for its inputs are 110 and it is enabled only by a 010 code in the register 44. The inverted output of the first stage of the shift register 44 is applied through an inverter 56 to an ANDNOT gate 57, and the output of the second stage of the shift register 44 is applied directly to the same ANDNOT gate 57. Thus, when both the first and the second stage of the shift register 44 contain logical ones, the ANDNOT gate 57 is enabled and generates a low signal at its output, which low signal is applied as one of the inputs of a NOR-gate 58. The NOR-gate 58 thus generates at its output an error signal, which in this case indicates that a key detect signal has occurred in each of two consecutive scan cycles, i.e., the error signal at the output of the gate 58 indicates a simultaneous depression of keys situation.

As a third illustration, consider the case when two new keys are depressed within the same scan cycle. Again assume that the shift register 44 contains a 000 code and that the storage devices 40 and 42 are in their reset states. The first key detect signal on the line 21*a* from the N-key rollover protection logic 21 sets the storage device 40 as explained earlier, and then the second key detect signal on the line 21*a* during the same scan cycle enables the NAND-gate 45*b* at the set input of the storage device 42 since the other input of the same gate 45*b* is from the not-Q output of the storage device 40 (which at that time is low and has been passed through the pass device 49). With the storage device 42 set, its not-Q output goes low, and the low signal thereon is passed through the NOR-gate 58 to generate an error signal at the output of that gate 58. This error signal indicates a simultaneous depression of keys situation resulting from the depression of two new keys in the same scan cycle.

The storage devices 40 and 42 are reset by the timing signal corresponding to the interrogation of the first key 14 of the keyboard matrix 12. The storage device 40 is reset through the NAND-gate 45*a*, and the storage device 42 is reset through a NAND-gate 45*c*. Note that if a key detect signal is on the line 21*a* during the time period corresponding to the interrogation of the first key 14 of the keyboard matrix 12, resetting of the device 40 is inhibited.

The data valid signal at the output of the gate 55 in FIG. 3 is applied to the output buffer 28 in FIG. 1 to latch thereon the eight-bit code accepted from the output of the intermediate buffer 26. The same data valid signal is delayed by one time period (by one sixty-fourth of the scan cycle) by means of a one cycle delay 29, and the output of the one cycle delay 29 is used to trigger strobe logic 30 to provide a strobe output which indicates that the contents of the output buffer 28 are stabilized and can be read out.

The error output of the gate 58 in FIG. 3 (in FIG. 1 it is the output of the validation logic 22 which is labeled ERROR) may be used to trigger a conventional alarm circuit, or to inhibit transmission, or for other conventional purposes.

We claim:

1. A keyboard encoder array to be interconnected with a keyboard matrix having keys each movable between a first and a second state to interrogate the keyboard matrix during successive scan cycles to detect keys in their second states, and to provide for each scan cycle a unique data signal identifying each key which is in its second state during that scan cycle but was not in its second state during the immediately preceding scan cycle, and for generating an error signal if two keys are in their second states for the first time during the same scan cycle, comprising:

storage means for receiving data signals from a keyboard and for storing during each scan cycle the data signals representing the state of the keys during the cycle;

comparison means for receiving data signals from the keyboard each scan cycle, said comparison means being coupled to said storage means for substantially simultaneously receiving data signals from said storage means representing the previous scan cycle, and for comparing the data signals received from the keyboard each scan cycle with the data signals stored during the immediately preceding scan cycle;

an output terminal of said comparison means for generating a key-detect signal at any time the comparison means receives a data signal signifying a key to be in its second state but fails to receive a corresponding data signal for the same key for the previous scan cycle, thus identifying a key which is in its second state during the scan cycle but was not in that second state during the immediately preceding scan cycle, and thereby generating key-detect signals only for newly depressed keys, and first validation means responsive to the output from said output terminal for generating an error signal when two or more key-detect signals are generated within the same scan cycle, said first validation means including first and second storage devices which are normally in a reset state, means for setting the first storage device in response to the first key-detect signal occurring during a cycle, means for setting the second storage device in response to a second key-detect signal occurring during the same scan cycle, and means for generating an error signal when both the first and the second storage devices are set within the same scan cycle.

2. A keyboard encoder array as in claim 1 including means for resetting the first and the second storage devices once each scan cycle.

3. A keyboard encoder array as in claim 2 wherein the first and the second storage devices are flip-flops, and the means for generating an error signal when both storage devices are set comprises a gate enabled by the set output of the second storage device to generate a signal at its output indicating an error.

4. A keyboard encoder array to be interconnected with a keyboard matrix having keys each movable between a first and a second state to interrogate the keyboard matrix during successive scan cycles to detect keys in their second states, and to provide for each scan cycle a unique data signal identifying each key which is in its second state during that scan cycle but was not in its second state during the immediately preceding scan cycle, and for generating an error signal if two keys are in their second states for the first time during the same scan cycle, comprising:

storage means for receiving data signals from a keyboard and for storing during each scan cycle the data signals representing the state of the keys during the cycle;

comparison means for receiving data signals from the keyboard each scan cycle, said comparison means being coupled to said storage means for substantially simultaneously receiving data signals from said storage means representing the previous scan cycle, and for comparing the data signals received from the keyboard each scan cycle with the data signals stored during the immediately preceding scan cycle;

an output terminal of said comparison means for generating a key-detect signal at any time the comparison means receives a data signal signifying a key to be in its second state but fails to receive a corresponding data signal for the same key for the previous scan cycle, thus identifying a key which is in its second state during the scan cycle but was not in that second state during the immediately preceding scan cycle, and thereby generating key-detect signals only for newly depressed keys, and first validation means responsive to the output from said output terminal for generating an error signal when two or more key-detect signals are generated within the same scan cycle, and second validation means responsive to the output from said output terminal for generating an error signal when a key-detect signal has been generated in each of two consecutive scan cycles.

5. A keyboard encoder array as in claim 4 wherein the second validation means include means for recording the key-detect signal generation history of consecutive scan cycles and for generating an error signal when a key-detect signal has been recorded in two consecutive scan cycles.

6. A keyboard encoder array as in claim 5 wherein the recording means include a serial shift register having at least two stages, each for one of two consecutive scan cycles, means for shifting through the shift register a first type logical signal for a scan cycle in which a key-detect signal is generated and a second type logical signal for a scan cycle in which no key-detect signal is generated, and means responsive to the presence of logical signals of the first type in the two stages of the shift register for generating an error signal.

7. A keyboard encoder array to be interconnected with a keyboard matrix having keys each movable between a first and a second state to interrogate the keyboard matrix during successive scan cycles to detect keys in their second state, and to provide for each scan cycle a unique data signal identifying each key which is in its second state during that scan cycle but was not in its second state during the immediately preceding scan cycle, and for generating an error signal if two keys are in their second states for the first time during the same scan cycle, comprising:

storage means for receiving data signals from a keyboard and for storing during each scan cycle the data signals representing the state of the keys during the cycle;

comparison means for receiving data signals from the keyboard each scan cycle, said comparison means being coupled to said storage means for substantially simultaneously receiving data signals from said storage means representing the previous scan cycle, and for comparing the data signals received from the keyboard each scan cycle with the data signals stored during the immediately preceding scan cycle;

an output terminal of said comparison means for generating a key-detect signal at any time the comparison means receives a data signal signifying a key to be in its second state but fails to receive a corresponding data signal for the same key for the previous scan cycle, thus identifying a key which is in its second state during the scan cycle but was not in that second state during the immediately preceding scan cycle, and thereby generating key-detect signals only for newly depressed keys, and first validation means responsive to the output from said output terminal for generating an error signal when two or more key-detect signals are generated within the same scan cycle, and second validation means for generating a data-valid signal when a key-detect signal has been only generated in the second of three consecutive cycles.

8. A keyboard encoder array as in claim 7 wherein the third validation means include a three-stage serial shift register, means for shifting into the register a first type logical signal for a scan cycle in which a key-detect signal has been generated and for shifting into the shift register a second type logical signal for a scan cycle in which no key-detect signal is generated, and means responsive to the shift register contents for generating said data-valid signal when the register contains a first type logical signal in the center of its three stages and contains a second type logical signal in each of its two remaining stages.

9. A keyboard encoder array to be interconnected with a keyboard matrix having keys each movable between a first and a second state to interrogate the keyboard matrix during successive scan cycles to detect keys in their second states, and to provide for each scan cycle a unique data signal identifying each key which is in its second state during that scan cycle but was not in its second state during the immediately preceding scan cycle, and for generating an error signal if two keys are in their second states for the first time during the same scan cycle, comprising:

storage means for receiving data signals from a keyboard and for storing during each scan cycle the data signals representing the state of the keys during the cycle;

comparison means for receiving data signals from the keyboard each scan cycle, said comparison means being coupled to said storage means for substantially simultaneously receiving data signals from said storage means representing the previous scan cycle, and for comparing the data signals received from the keyboard each scan cycle with the data signals stored during the immediately preceding scan cycle;

an output terminal of said comparison means for generating a key-detect signal at any time the comparison means receives a data signal signifying a key to be in its second state but fails to receive a corresponding data signal for the same key for the previous scan cycle, thus identifying a key which is in its second state during the scan cycle but was not in that second state during the immediately preceding scan cycle, and thereby generating key-detect signals only for newly depressed keys, and validation means for generating an error signal when a key-detect signal is generated in each of two consecutive scan cycles.

10. A keyboard encoder array to be interconnected with a keyboard matrix having keys each movable between a first and a second state to interrogate the keyboard matrix during successive scan cycles to detect keys in their second states, and to provide for each scan cycle a unique data signal identifying each key which is in its second state during that scan cycle but was not in its second state during the immediately preceding scan cycle, and for generating an error signal if two keys are in their second states for the first time during the same scan cycle, comprising:

storage means for receiving data signals from a keyboard and for storing during each scan cycle the data signals representing the state of the keys during the cycle;

comparison means for receiving data signals from the keyboard each scan cycle, said comparison means being coupled to said storage means for substantially simultaneously receiving data signals from said storage means representing the previous scan cycle, and for comparing the data signals received from the keyboard each scan cycle with the data signals stored during the immediately preceding scan cycle;

an output terminal of said comparison means for generating a key-detect signal at any time the comparison means receives a data signal signifying a key to be in its second state but fails to receive a corresponding data signal for the same key for the previous scan cycle, thus identifying a key which is in its second state during the scan cycle but was not in that second state during the immediately preceding scan cycle, and thereby generating key-detect signals only for newly depressed keys, and validation means for generating a data-valid signal when a key-detect signal has been generated only in the second of a first, second and third consecutive scan cycle.

11. A keyboard encoder array to be interconnected with a keyboard matrix having keys each movable between a first and a second state to interrogate the keyboard matrix during successive scan cycles to detect keys in their second states, and to provide for each scan cycle a unique data signal identifying each key which is in its second state during that scan cycle but was not in its second state during the immediately preceding scan cycle, and for generating an error signal if two keys are in their second states for the first time during the same scan cycle, comprising:

storage means for receiving data signals from a keyboard and for storing during each scan cycle the data signals representing the state of the keys during the cycle;

comparison means for receiving data signals from the keyboard each scan cycle, said comparison means being coupled to said storage means for substantially simultaneously receiving data signals from said storage means representing the previous scan cycle, and for comparing the data signals received from the keyboard each scan cycle with the data signals stored during the immediately preceding scan cycle;

an output terminal of said comparison means for generating a key-detect signal at any time the comparison means receives a data signal signifying a key to be in its second state but fails to receive a corresponding data signal for the same key for the previous scan cycle, thus identifying a key which is in its second state during the scan cycle but was not in that second state during the immediately preceding scan cycle, and thereby generating key-detect signals only for newly depressed keys, and validation logic means for successively recording key-detect signals generated in each of a first, second and third successive scan cycles and for generating a data-valid signal when a key-detect signal is recorded only for the second of the three consecutive scan cycles, and including means for enabling the keyboard encoder means to output the code corresponding to the key generating said key-detect signal only when a data-valid signal is generated.

12. A keyboard encoder array to be interconnected with a keyboard matrix having keys each movable between a first and a second state to interrogate the keyboard matrix during successive scan cycles to detect keys in their second states, and to provide for each scan cycle a unique data signal identifying each key which is in its second state during that scan cycle but was not in its second state during the immediately preceding scan cycle, and for generating an error signal if two keys are in their second states for the first time during the same scan cycle, comprising:

storage means for receiving data signals from a keyboard and for storing during each scan cycle the data signals representing the state of the keys during the cycle;

comparison means for receiving data signals from the keyboard each scan cycle, said comparison means being coupled to said storage means for substantially simultaneously receiving data signals from said storage means representing the previous scan cycle, and for comparing the data signals received from the keyboard each scan cycle with the data signals stored during the immediately preceding scan cycle;

an output terminal of said comparison means for generating a key-detect signal at any time the comparison means receives a data signal signifying a key to be in its second state but fails to receive a corresponding data signal for the same key for the previous scan cycle, thus identifying a key which is in its second state during the scan cycle but was not in that second state during the immediately preceding scan cycle, and thereby generating key-detect signals only for newly depressed keys, and validation means for generating an error signal when a key-detect signal is generated in each of two or more scan cycles of a predetermined number of consecutive scan cycles.

13. A keyboard encoder array as in claim 12 wherein said validation means comprises recording means for successively recording key-detect signals generated in each of a predetermined number of successive scan cycles and for generating a data-valid signal when a key-detect signal is recorded in only one of said consecutive scan cycles, and including means for enabling the keyboard encoder means to output the code corresponding to the key generating said key-detect signal only when a data-valid signal is generated.

14. A keyboard encoder for generating a signal for each new key depressed in a keyboard having a plurality of keys, whether or not a previously depressed key still remains depressed, comprising:

scanning means for serially scanning each key of the keyboard along a predetermined scan pattern to produce a signal information train containing one time interval for each of the keys of the keyboard, and containing within each such time interval a signal if the corresponding key is depressed, a comparison circuit having at least first and second input terminals and an output terminal for generating an output signal whenever a signal appears on its first input terminal and not on its second input terminal, a storage device having a storage capacity at least sufficient to store a number of signals equal to the number of keys of the keyboard, the output of said storage device being electrically connected to the second input terminal of the comparison circuit, circuit means coupling said scanning means to said storage device for supplying said signal information train to said storage device to store therein information signals corresponding to one complete scan of the keyboard, circuit means coupling said scanning means to the first input terminal of said comparison circuit for supplying said signal information train serially to said first input terminal, and means for synchronously advancing out of the storage means, to the second input terminal of the comparison circuit, the information train then stored in the storage device from the previous scan of the keyboard, the output terminal on said comparison circuit generating a key-detect signal when said first input terminal receives a signal from the present scan of the keyboard while the second input terminal fails to receive a signal from the corresponding key in the previous scan.

15. A keyboard encoder as in claim 14 wherein the storage device is a shift register.

16. A keyboard encoder as in claim 14 wherein the signals derived from the keyboard are digital in nature, being either of two levels depending upon whether or not a key is depressed, these signal levels representing the digits 1 and 0 respectively, and wherein the comparison circuit is a 0/1 detector in that it generates an output signal when the input signals on its first and second input terminals are a 1 and 0, respectively.

17. A keyboard encoder as in claim 14 further including gating means connected electrically to said keyboard and to the output terminal of the comparison circuit, said gating means operating to pass information signals received from said keyboard whenever it is supplied by a key-detect signal from said comparison circuit.

18. A real time N-key rollover protection logic circuit for generating a single signal for each new key depressed in a keyboard having a plurality of keys, whether or not previously depressed keys still remain depressed, comprising:

storage means for receiving an information signal train from a keyboard representative of one complete scan of the keyboard, and containing a signal for each key that is depressed, a comparison circuit having first and second input terminals for receiving at its first input terminal a serial information signal train derived from a serial scan of the keyboard, while the keyboard is being scanned, and while the storage means is receiving the same information signal train, circuit means connecting the output of said storage means with the second input terminal of said comparison circuit, means for advancing the information signal train serially out of said storage means to the second input terminal of the comparison circuit, synchronously with the receipt at the first input terminal of the comparison circuit of a serial signal information train derived from a real time scan of the keyboard, and an output terminal of said comparison circuit for producing a key-detect signal whenever said first input terminal receives a key-depressed signal from a keyboard scan while the second input terminal fails to receive a corresponding key-depressed signal from the previous scan of the keyboard.

19. A keyboard encoder circuit for generating a signal representing the actuation of a key in the keyboard, including:

scanning means for serially scanning the keys of the keyboard in successive scan cycles to provide in each scan cycle data signals serially generated which identify the state of actuation of each key, storage means for storing during each scan cycle the data signals representing the actuation states of the keys during the cycle, and for providing serially generated output signals during the next scan cycle representing the data signals stored during the previous scan cycle, the output signals being provided in time coincidence with the data signals generated by the scanning means during said next scan cycle, so that a stored data signal for a key is reproduced at the same time that the scanning means provides a new data signal for that same key, and gate means provided with the serially generated data signals and the output signals from said storage means for generating a key-detect signal upon receipt of both a data signal representing a key in an actuated state during a scan cycle and an output signal from said storage means representing the same key in a non-actuated state during the previous scan cycle, so as to generate key-detect signals only upon the initial actuation of keys in the keyboard.

20. A circuit according to claim 19 in which the storage means comprises a shift register having *n* stages corresponding to a keyboard having *n* keys.

21. A circuit according to claim 19 including means for generating an error signal when at least one key-detect signal corresponding to an actuated key in the keyboard is generated during each of two or more scan cycles within a period including a predetermined number of consecutive scan cycles.

22. A circuit according to claim 21 in which said error signal generating means comprises a plurality of storage devices each set in response to key-detect signals in different scan cycles, and means responsive to the setting of a plurality of said storage devices for generating said error signal.

23. A keyboard encoder circuit for generating a signal representing the actuation of a key in the keyboard, including:

interrogation means for electrically interrogating the keys of the keyboard in rapid successive interrogation cycles to provide in each interrogation cycle key-actuation signals which identify the keys in the keyboard that are in an actuated state, means for generating a first error signal when at least one key-actuation signal corresponding to an actuated key in the keyboard is generated during each of a plurality of scan cycles within a period including a predetermined number of consecutive scan cycles.

24. A circuit according to claim 23 in which said error signal generating means comprises a plurality of storage devices each set in response to key actuation signals in different scan cycles, and means responsive to the setting of a plurality of said storage devices for generating said error signal.

25. A keyboard encoder circuit according to claim 24 including means responsive to the setting of only one of said storage devices for generating a valid data signal.

* * * * *

UNITED STATES PATENT OFFICE
CERTIFICATE OF CORRECTION

Patent No. 3,792,466 Dated May 31, 1972

Inventor(s) Edward H. Arnold et al.

It is certified that error appears in the above-identified patent and that said Letters Patent are hereby corrected as shown below:

Column 14, lines 2-4, delete "for generating an error signal if two keys are in their second states for the first time during the same scan cycle," and insert therefor:
--for generating a data-valid signal if only one key is in its second state during a scan cycle, but not during the previous scan cycle, so as to generate a second state key-detect signal, only during the second of three successive scan cycles,--

Column 14, lines 40-42, delete "for generating an error signal if two keys are in their second states for the first time during the same scan cycle," and insert therefor:
--for generating a data-valid signal if only one key is in its second state during a scan cycle, but not during the previous scan cycle, so as to generate a second state key-detect signal, only during the second of three successive scan cycles,--

FORM PO-1050 (10-69)

USCOMM-DC 60376-P69
U.S. GOVERNMENT PRINTING OFFICE 869-930

UNITED STATES PATENT OFFICE
CERTIFICATE OF CORRECTION

Patent No. 3,792,466 Dated May 31, 1972

Inventor(s) Edward H. Arnold et al.

It is certified that error appears in the above-identified patent and that said Letters Patent are hereby corrected as shown below:

Column 15, line 19, delete "the same scan cycle" and insert therefor -- two or more scan cycles of a predetermined number of successive scan cycles --.

Column 16, line 3, after "signal" first occurrence, insert -- during each said serial scan --.

Column 16, line 19, after "terminal", insert -- as the keyboard is being scanned --.

line 30, delete "synchronously"

line 34, after "keyboard," insert -- synchronously with the signal information being received by the first input terminal from the current serial scan of the keyboard, --.

Signed and sealed this 11th day of March 1975.

(SEAL)
Attest:

RUTH C. MASON
Attesting Officer

C. MARSHALL DANN
Commissioner of Patents
and Trademarks

Notice of Adverse Decision in Interference

In Interference No. 99,058, involving Patent No. 3,792,466, E. H. Arnold and D. L. McLaughlin, KEYBOARD ENTRY SYSTEM WITH N-KEY ROLLOVER AND N-KEY LOCKOUT PROTECTION, final judgment adverse to the patentees was rendered Oct. 25, 1977, as to claims 18, 19 and 20.

[*Official Gazette February 14, 1978.*]